United States Patent [19]
Menegozzi et al.

[11] Patent Number: 6,061,022
[45] Date of Patent: May 9, 2000

[54] AZIMUTH AND ELEVATION DIRECTION FINDING SYSTEM BASED ON HYBRID AMPLITUDE/PHASE COMPARISON

[75] Inventors: Lionel Nicholas Menegozzi, Annandale; Albert Charles Harding, Stockholm; Edward F. Van Alstine, Wyckoff, all of N.J.

[73] Assignee: ITT Manufacturing Enterprises, Inc., Wilmington, Del.

[21] Appl. No.: 09/326,357

[22] Filed: Jun. 4, 1999

[51] Int. Cl.$^7$ ...................................................... G01S 5/04
[52] U.S. Cl. ............................................. 342/442; 342/140
[58] Field of Search .............................. 342/56, 140, 174, 342/432, 442

[56] References Cited

U.S. PATENT DOCUMENTS

| | | |
|---|---|---|
| 3,953,777 | 4/1976 | McKee . |
| 4,975,710 | 12/1990 | Baghdady . |
| 5,541,608 | 7/1996 | Murphy et al. . |
| 5,608,411 | 3/1997 | Rose . |
| 5,646,624 | 7/1997 | Cope et al. . |
| 5,724,047 | 3/1998 | Lioio et al. . |
| 5,771,019 | 6/1998 | Wachs et al. . |

OTHER PUBLICATIONS

R. B. Dybdal, "Monopulse Resolution of Interferometric Ambiguities", pp 177–183, *IEEE transactions on Aerospace and Electronics Systems*, vol. AES–22, No. 2 Mar. 1986.

*Primary Examiner*—Thomas H. Tarcza
*Assistant Examiner*—Dao L. Phan
*Attorney, Agent, or Firm*—Saul Elbaum

[57] ABSTRACT

A method for finding a direction associated with a radiated electromagnetic wave, the method including the steps of: detecting the radiated electromagnetic wave; measuring at least one gain difference and at least one phase difference associated with the detected electromagnetic wave; estimating an elevational angle and an azimuthal angle associated with the detected electromagnetic wave using the at least one measured gain difference; determining a plurality of possible elevational and azimuthal angles associated with the detected electromagnetic wave using the at least one measured phase difference; and, respectively selecting one of the plurality of possible elevational and one of the plurality of possible azimuthal angles as elevational and azimuthal angles associated with the detected electromagnetic wave using the estimated elevational and azimuthal angles.

20 Claims, 10 Drawing Sheets

AZIMUTH AND ELEVATION DIRECTION FINDING SYSTEM BASED ON HYBRID AMPLITUDE/PHASE COMPARISON

FIELD OF INVENTION

The present invention relates generally to a direction finding ("DF") system for aircraft. More particularly, it relates to a DF system which compares the amplitude and phase of electromagnetic signals directed at the aircraft and received thereby.

BACKGROUND OF INVENTION

Two basic direction finding ("DF") techniques have been widely used in the prior art to measure the angular coordinates of incoming electromagnetic radiation. Both techniques employ two or more antennas at the aircraft to receive an electromagnetic signal at the aircraft's location. The signals received by the different antenna elements are compared, whereupon the angular position of a source of the electromagnetic radiation is computed by a processor.

The first of these techniques, designated an amplitude comparison system, compares only the relative amplitude of the signals received by the different antenna elements. This approach is relatively inexpensive to incorporate but also relatively inaccurate. Generally, it can be characterized as including a pair of antennas on an aircraft which are employed to simultaneously but independently receive the incoming signal. The antennas, typically broadband spiral antennas, have apertures squinted off the boresight axis at angles $+\theta s$ and $-\theta s$, respectively. An incoming RF signal approaching at an angle $\theta$ from the antenna axis is received differently by the antenna elements. The orientation of the antennas A1 and A2 results in the antenna patterns $G_1(\theta)$ and $G_2(\theta)$. These antenna patterns are typically broad with 3 dB beamwidths generally greater than 60°. As such, a mathematical function can easily be derived which simulates these patterns. The measured amplitude (electromagnetic field strength) of the signals received by the antennas can be compared to one another to determine the angle of arrival $\theta$ of the source of the signal relative to the axis of the antenna at the aircraft.

While the amplitude comparison system is relatively simple and cost effective, its accuracy is typically on the order of one-tenth of the antenna beamwidth (i.e., about 10°) which is rather poor. Accuracy is basically limited as a result of the inability to accurately measure small differences in amplitude between the received signal at the squinted antenna elements.

A more precise, albeit complex DF approach is known as phase interferometry or phase comparison. According to this technique the pair of antenna elements are separated by a distance "d" and independently receive the transmitted signal. With this approach, the planar apertures of the antennas lie in the same plane rather than being squinted away from one another. To determine azimuth positions, the antennas would be positioned on the y axis; to determine elevation angles, they would lie on the z axis. For the azimuth case, a plane wave propagating toward an aircraft, and arriving at an angle $\theta$ from boresight (the x axis) is received by each of the two antennas. A phase difference $\Delta\phi$ between the signals received by the two antennas is expressed as $\Delta\phi = 2\pi d \sin(\theta)/\lambda$, where $\lambda$ is the wavelength of the signal propagating from the unknown angular location.

The plane wave travels an extra distance $l = d \sin(\theta)$ to reach one antenna as compared to the other antenna, thus the phase of the signal received by the first antenna lags accordingly. The phase of the two received signals are compared by a phase comparator and then frequency detected, with the results supplied to a processor where the azimuth angle $\theta$ of the radiation source is readily computed.

The primary drawback of the phase interferometer approach is that more than one angular position of the target emitter can produce the same phase relationship between the signals received by the two antennas. Consequently, ambiguities in angular position will result with the two antenna approach. The ambiguity problem can be solved by employing one or more additional antennas or pairs of antennas with different baseline spacings between these additional antennas. Ambiguities are then resolved by comparing electrical phase between several pairs of antennas. Once the ambiguities are eliminated, angle of arrival accuracy of the phase interferometry system better than 0.5 degree accuracy has been reported.

However, finding adequate installation locations for the extra antennas renders this type of system impractical, and more so for military aircraft platforms attempting to achieve a small radar cross section.

An attempt to resolve interferometric ambiguities is illustrated in U.S. Pat. No. 5,724,047, entitled "Phase and Time-Difference Precision Direction Finding System", therein phase interferometry is used between planar elements (which are not squinted) to determine the ambiguous angle of arrival. The multiple ambiguities that ensue are resolved by using time-difference-of-arrival (TDOA) of the signal between the two antenna elements. However use of TDOA implies very accurate measurement of time difference in the 10's of picosecond time range, with considerable processing to determine the TDOA by correlation of the signals at the two elements. Accordingly, such an approach results in undesirable more complex and expensive or larger systems.

The accuracy of the angle-of-arrival (AOA) measurements can be degraded if the electromagnetic signal is received from a location that is not at the same elevation as the receiving antennas.

An attempt to reduce elevation induced error is illustrated in U.S. Pat. No. 5,608,411, entitled "Apparatus For Measuring A Spatial Angle To An Emitter Using Squinted Antennas". Therein squinted, doubly polarized (LHCP and RHCP) elements are used to obtain an unambiguous, approximate value of the elevation angle through an induced phase-bias measured by polarization switching at the squinted antennas. However, the use of polarization snitching, phase-bias or other techniques such as is discussed provide only a course estimate of the elevation angle.

SUMMARY OF INVENTION

A method for finding a direction of arrival associated with a radiated electromagnetic wave, the method including the steps of: detecting the radiated electromagnetic wave; measuring at least two gain differences and at least two phase differences associated with the detected electromagnetic wave; estimating an elevational angle and an azimuthal angle associated with the detected electromagnetic wave using the at least two measured gain differences; determining a plurality of possible elevational and azimuthal angles associated with the detected electromagnetic wave using the at least two measured phase differences; and, respectively selecting one of the plurality of possible elevational and one of the plurality of possible azimuthal angles as elevational and azimuthal angles associated with the detected electromagnetic wave using the estimated elevational and azimuthal angles, and device for performing the same.

DETAILED DESCRIPTION OF THE INVENTION

Figure 1:
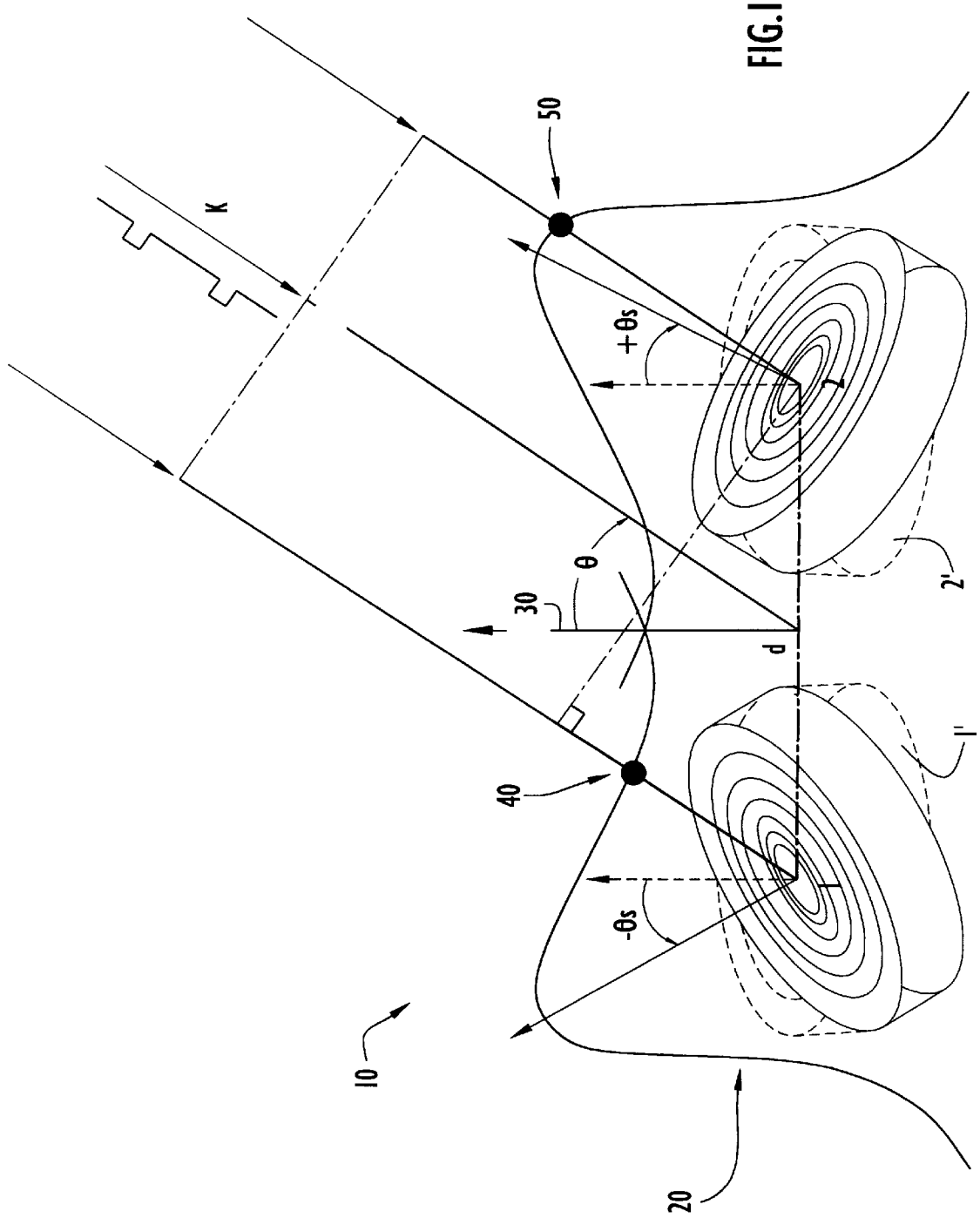
FIG. 1 illustrates the combination of two antenna elements into a hybrid phase/amplitude comparison unambiguous azimuth-only direction finding system.

The present new invention can be seen as an improvement of the device illustrated in U.S. Pat. No. 5,541,608, issued July 1996 to the common assignee hereof, the entire disclosure of which is hereby incorporated by reference. The present invention uses phase interferometry between multiple co-located elements for accurate azimuth and elevation measurements and then uses amplitude comparison between the squinted antenna elements in order to resolve the interferometric ambiguities in both the azimuth and elevation planes.

Generally, a method/apparatus for performing accurate geolocation of microwave emitters has been developed. Airborne, precision direction finding (DF), both in azimuth and elevation is accomplished by using a hybrid amplitude-phase comparison antenna system. The amplitude difference and phase difference of the emitter(s) signal is measured through pairs of squinted, broadband antenna elements. An accurate, but ambiguous direction of arrival is interferometrically generated, and a course but unambiguous indication of direction of arrival is obtained via amplitude-comparison. This unambiguous indication is used to resolve the ambiguity of the interferometric indication.

Different from conventional multiple-arm planar designs, the present design uses squinted elements both in azimuth and elevation which allows the location of the spiral antennas within a small, conformal size at the aircraft skin. Hence, an added advantage is the potentially low radar-cross-section (RCS) of the system, which is important in defense applications. Multiple-arm, planar interferometer designs (no squint angles) may attain higher overall accuracy, however additional elements are needed to achieve correct ambiguity resolution. Furthermore, the required relation (e.g. prime number) between the large/small interferometer arms implies less conformability, larger system size, and larger RCS. The selection of a particular technique involves trade-off between a host of parameters and constraints such as: frequency range, field-of-view, required accuracy, signal sensitivity, overall system size, projected conformability with aircraft platform, associated radar-cross-section (RCS), system complexity and costs. Because of constraints such as symmetry, frequency of operation, required accuracy, and size considerations, two design embodiments are set forth herein as the most practical trade-off. However, other design configurations could of course be utilized. These two designs can be summarized as follows.

(a) Four antenna elements, with two broadband antenna elements squinted in azimuth, and two squinted in elevation.

(b) Three symmetrically located broadband antenna elements, with two elements squinted in azimuth, and one element with similar squint angle, but in elevation.

For same arm sizes, both designs (a) and (b) have similar azimuth accuracy. Design (a) is somewhat easier to calibrate, and simulations indicate that (a) is about 15% more accurate in elevation than (b). However, design (a) implies an increase in system complexity, RCS and costs. The discussion below, will be restricted to system (b). However the same concepts can be applied in a straightforward manner to a discussion of system (a), or for that matter any other suitable configuration.

Considering a practical frequency range of several GHz. (e.g. $\lambda$'s in the range of 15 cm to 1.5 cm), fields-of-view of about ±50° off-system axis, and a required angular accuracy of about 1°; the possible choices for an airborne system are somewhat narrowed down. For example, spiral antennas provide convenient system elements because of their wideband characteristics, slowly varying beamwidth over the frequency range, small physical size, easy conformability and small RCS. Since spiral antenna have a broad beam with a concomitant gain, the necessary angular accuracy is achievable mainly through their use in a phase-interferometer configuration.

In an interferometric system, the angular information is derived from measurements of the phase difference between pairs of antenna elements. An important factor influencing the angular accuracy is the separation between the antenna elements relative to the radiation wavelength, the accuracy increases with large relative baseline dimensions $(d/\lambda) \gg 1$. When the baseline dimension exceeds one wavelength, a well-known difficulty arises because the relative phase difference can only be measured in a modulo $2\Pi$ sense. That is, when the baseline dimension exceeds one wavelength, the phase difference between the excitation at each antenna element can exceed one cycle, and angular ambiguities occur. The ambiguities correspond to the unknown absolute value of the phase/cycle.

The literature contains a number of references to several techniques used to resolve the ambiguities arising with baseline $d \geq \lambda$. Additional elements within the main interferometer arm are often used to derive redundant phase information. However, multiple-arm interferometry approaches also increase the necessary real estate for system installation, overall system RCS, system complexity, costs and maintenance.

Other authors such as M. Skolnik (*Introduction to Radar Systems*, McGraw-Hill Co., 1962) and E. Baghdady (U.S. Pat. No. 4,975,710, December 1990) describe methods which use the relative motion of the interferometer to resolve the ambiguities. Obviously these methods are limited by system constraints and their scope/practicality depend on the application.

ITT Industries, the assignee hereof, has developed an approach (U.S. Pat. No. 5,541,608, July 1996, the entire disclosure of which is hereby incorporated by reference) which is more economical than redundant-arm interferometry methods, and which is expedient for defense applications such as situation assessment, jammer control and emitter geolocating purposes.

Rather than adding additional antenna elements to resolve the phase ambiguities, the approach is based on a hybrid combination of both amplitude comparison and interferometric techniques. The hybrid approach allow the use of two antenna elements, squinted in azimuth and assembled on a small conformal configuration, with low RCS and an angle accuracy of about 1° rms. Theoretical considerations for amplitude-phase techniques can be found in the literature (e.g., R. B. Dybal, IEEE AES-22, No. 2, March 1986).

The squinted elements of an azimuth-only hybrid DF system allow for additional, unambiguous angle sensing information by amplitude-comparison of the signal arriving to the broadband antenna elements. FIG. 1 depicts the basic concepts for the original design of the azimuth-only DF system 10.

Briefly stated, the driving concept for the hybrid system 10 is as follows. The interferometric measurements locate candidate angle-of-arrival directions with good accuracy, while the amplitude-comparison subsystem selects the correct arrival direction from a collection of possible ones (ambiguity resolution). The angular resolution associated with amplitude-comparison (about 0.1 of the element beamwidth) is normally coarse compared with resolution of the interferometer, however, it must be sufficient to correctly resolve between neighboring interferometric candidates (the angle between ambiguities is approximately given by $[\lambda/d \cos(\theta)]$ rad).

Ambiguity resolution is more difficult at short wavelengths (higher frequencies) and a statistical analysis was developed to assess the probability of "ambiguity-jumps" versus system parameters.

More particularly, referring now specifically to FIG. 1, therein is illustrated a wave vector K representative of an angle-of-arrival for radiation received from a source. Therein, antennas 1 and 2 can be seen to be squinted with respect to the system axis 30 as opposed to positions 1' and 2' which would represent the antennas in a non-squinted configuration. Therein, reference numeral 20 refers to a gain pattern of the squinted antenna elements 1 and 2. The wave vector K, representative of the angle-of-arrival, can be seen to be approaching the system axis 30 at an angle $\theta$, and the antennas 1 and 2 can be seen to have a separation of d. Accordingly, the gain of antenna 1 is represented at point 40 on gain pattern 20, and can be seen to be $G(\theta+\theta_s)$, while the gain at 50 can be seen to be $G(\theta-\theta_s)$. A phase comparison measurement can be made wherein the phase differential equals $(K \cdot d) = (2\Pi d/\lambda) \sin(\theta)$, and the amplitude comparison measurement can be made wherein gain differential equals $[G(\theta-\theta_s)-G(\theta+\theta_s)]=C(\theta_s, \theta_{bw}) \sin(\theta)$ wherein $\theta_s$ represents the angle of squinting of the antennas 1, 2 with respect to the system axis 30, and $\theta_{bw}$ represent the width of the gain patterns.

Airborne azimuth-only systems are especially suitable for low flying platforms, such as helicopters. Azimuth-only angular measurements are sufficient for low flying aircraft because of the normally small relative elevation angles between the aircraft and threat emitters. However, with high-flying aircraft substantial relative elevation angles arise (e1≥0.175 rad.≈10°), and under these conditions, angle measurements with azimuth-only systems contain spurious contributions due to coning-error effects, see FIGS. 2 and 3.

These figures clearly show that for radiation angles of arrival off the antenna axis, the magnitude of the coning error is comparable, or exceeds 1°. This seriously undermines the intended accuracy of the azimuth-only DF system. Under these conditions, emitter geolocation through airborne triangulations, is no longer accurate.

Figure 2:
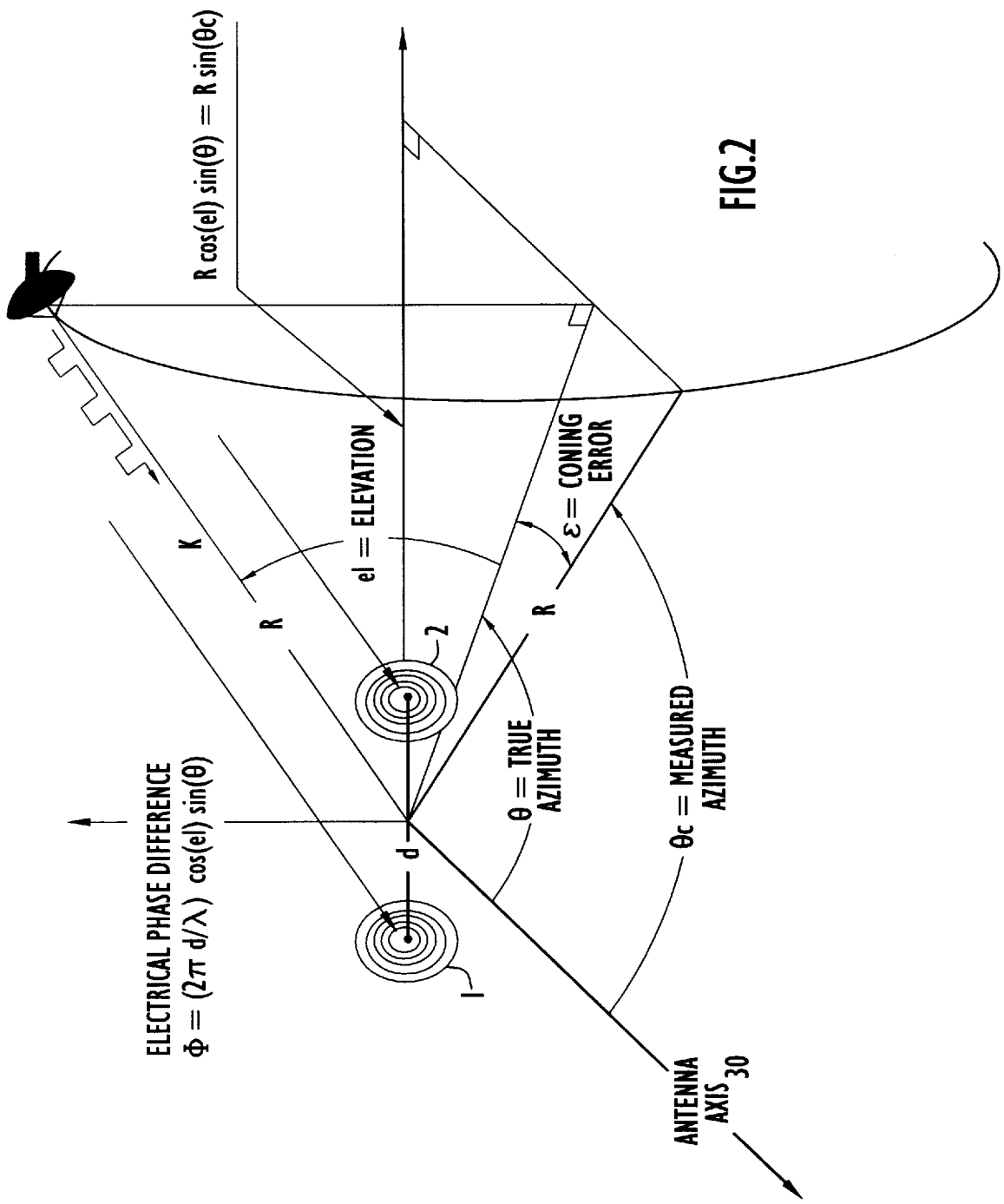
FIG. 2 illustrates the theory of coning error at significant elevation angles in azimuth-only systems.
Figure 3:
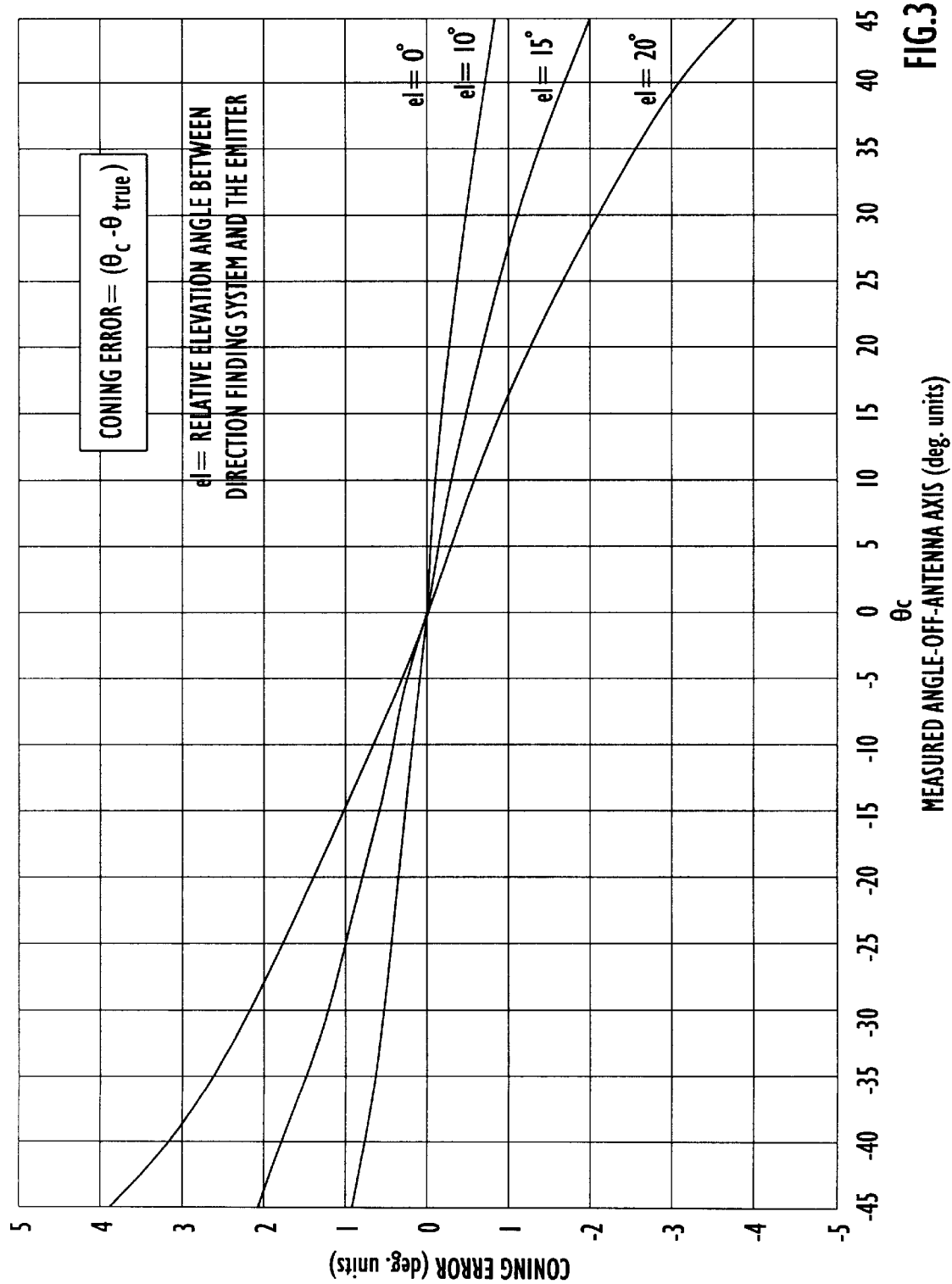
FIG. 3 illustrates coning error at different elevation angles in azimuth-only systems.

FIG. 2 indicates that the functional dependence of the measured azimuth, $\theta_c$, on the elevation angle, e1, is well-known, that is, $\sin(\theta_c)=\cos(e1) \sin(\theta_{true})$. Thus, in order to obtain an accurate azimuth angle, i.e. the true azimuth $\theta_{true}$, one must perform an independent measurement of the elevation angle (unless $\cos(e1)\approx1$, i.e., $e1 \leq 0.1$ rad ~6°).

Precision emitter triangulation performed with highflying aircraft, require accurate DF measurements, both in azimuth and elevation. Hence, a new enhanced DF system with both azimuth and elevation capabilities is needed and is the subject of this patent proposal.

Figure 4:
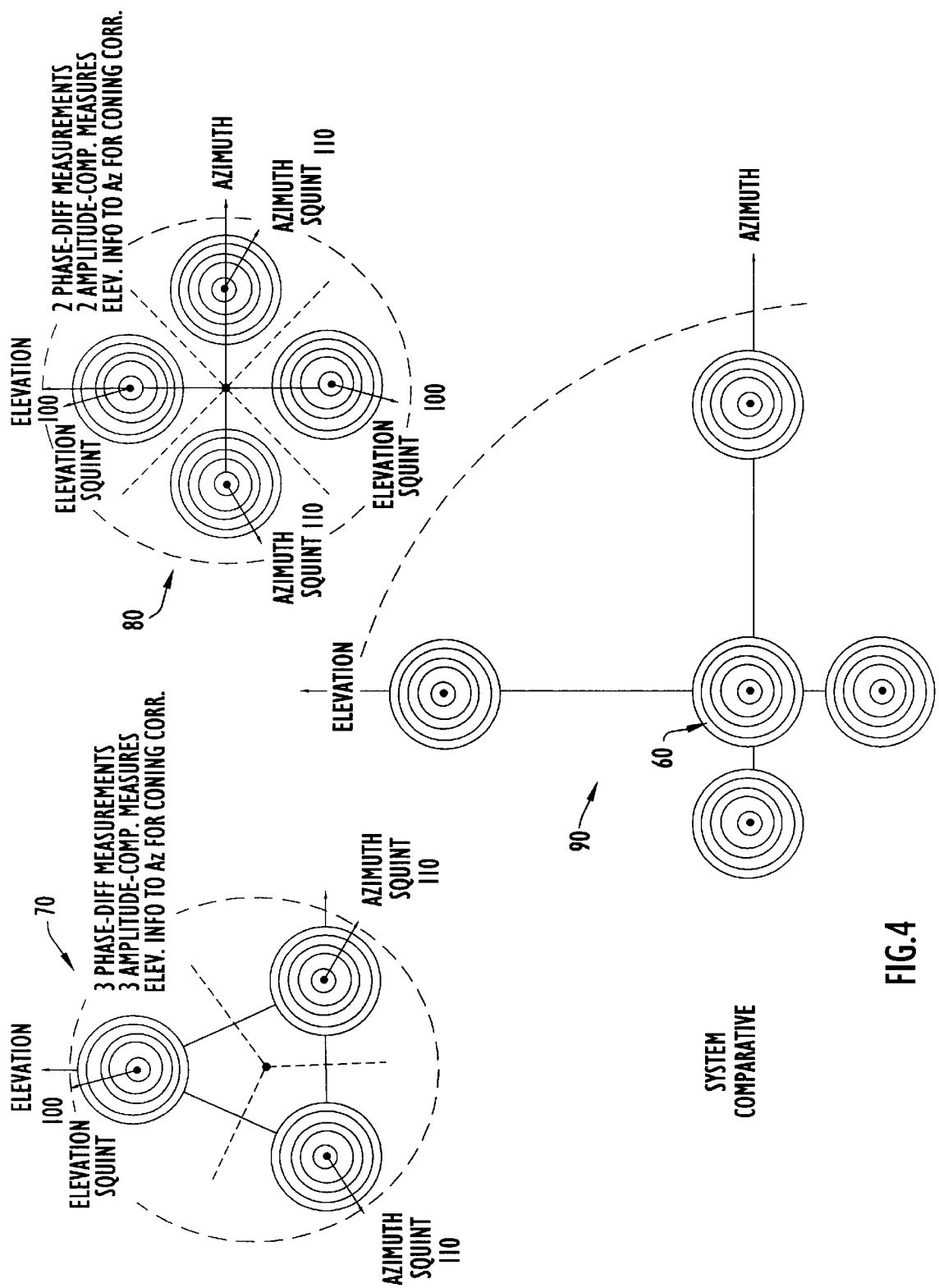
FIG. 4 illustrates the relative size and complexity of the antenna configuration for several types of azimuth and elevation DF systems.

FIGS. 4 through 9 schematically illustrate alternative embodiment of the present invention approach to an azimuth plus elevation DF hybrid system. FIG. 4 illustrates and compares the hybrid approach with multi-arm, planar interferometer designs. The latter, provides a very precise method, but at the expense of larger size and RCS, complexity and costs. The instant system design is, in this sense the resultant of a compromise between competing constraints and trade-off.

More particularly, FIG. 4 illustrates both the 3-(70) and 4-(80) element hybrid configurations according to the present invention as well as the conventional planar multiple-arm interferometry configuration (9).

Regarding the 3- and 4-element configurations 70, 80 according to the present invention, the squint angles in elevation 100 and azimuth 110 allow both the location of the broadband antenna elements within a relatively small conformal size, and the use of amplitude comparison to resolve associated ambiguities. The 3-element configuration 70 requires three phase-differential measurements and three amplitude-comparison measurements in order to accurately ascertain a direction both in azimuth and elevation. In addition, the elevational information is used to correct for coning error. In contrast, the 4-element configuration 80 requires two-phase differential measurements and two amplitude comparison measurements.

Regarding the conventional planar multiple-arm interferometry configuration of 90 FIG. 4, it can be seen to require a redundant element 60 to resolve the inherent ambiguities. In the absence of squint angles, the size of the element plus the required (prime number) relation between the large/small arms implies a larger system size, and hence increased RCS, complexity and cost. Additionally, conventional systems require two extra phase differential measurements for ambiguity resolution and coning effect correction.

Figure 5:
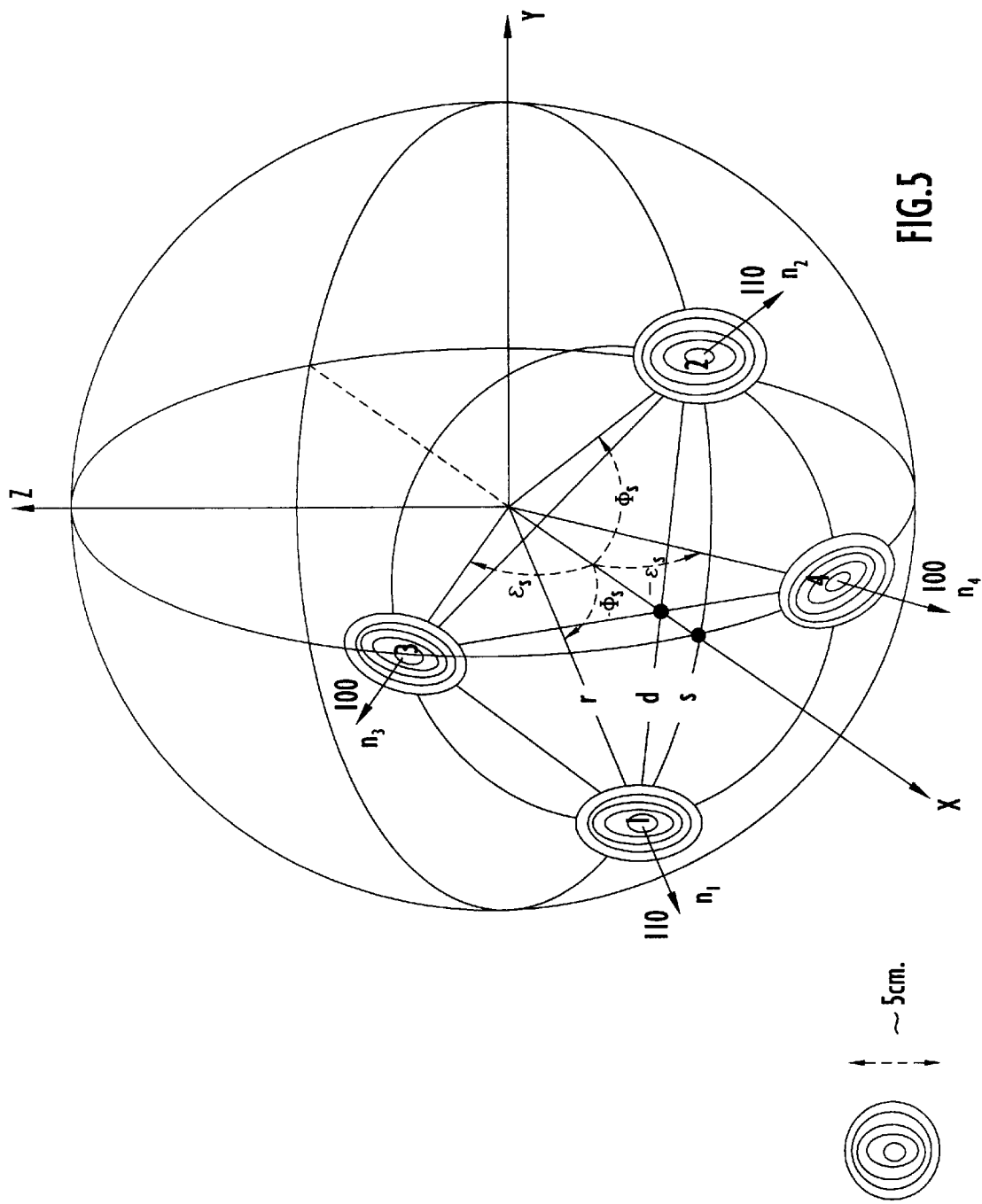
FIG. 5 illustrates a hybrid phase-amplitude DF system with squinted elements for azimuth and elevation angle measurements.
Figure 6:
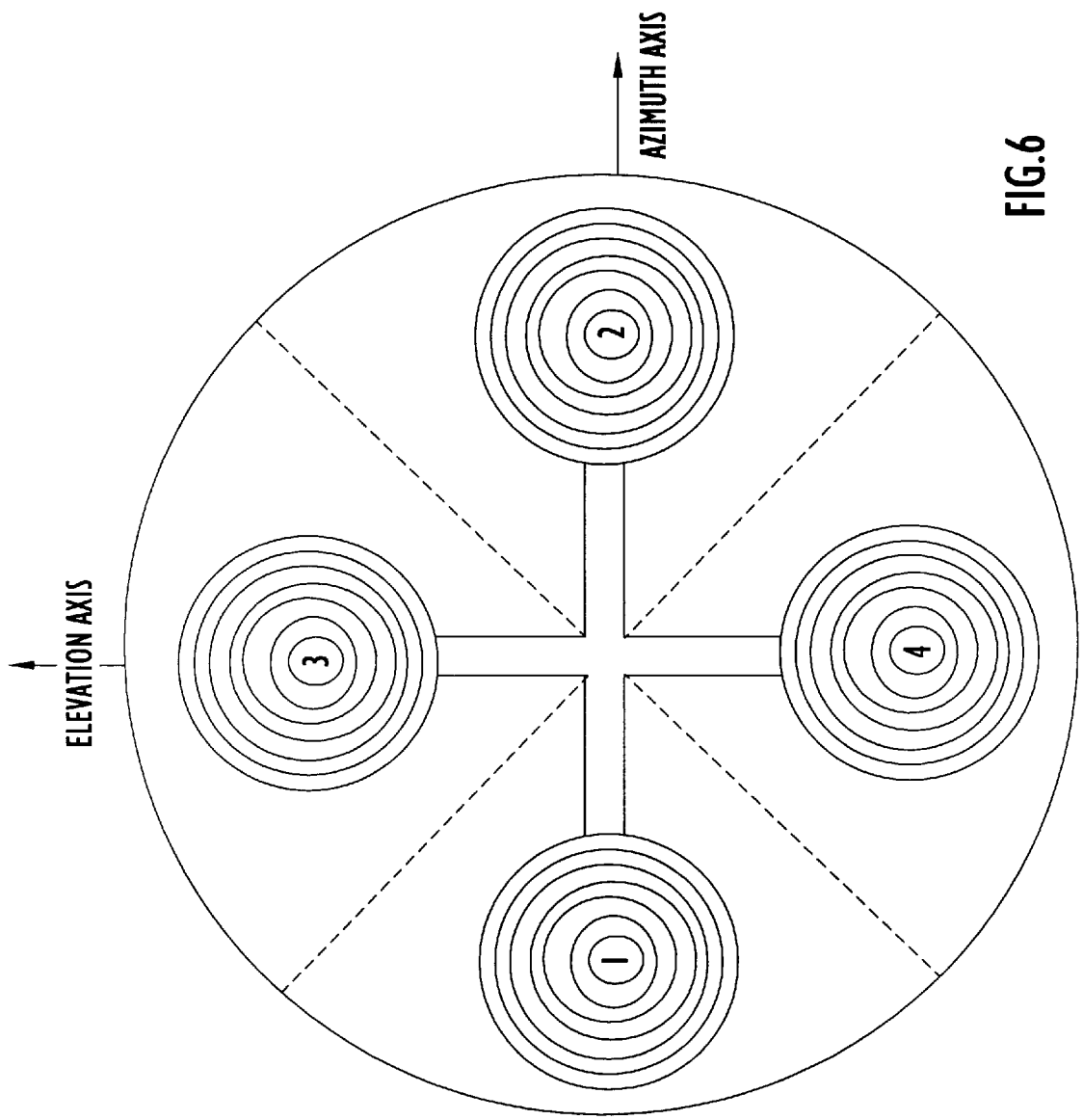
FIG. 6 illustrates an azimuth and elevation angle measurements system configuration including four squinted antenna components.
Figure 7:
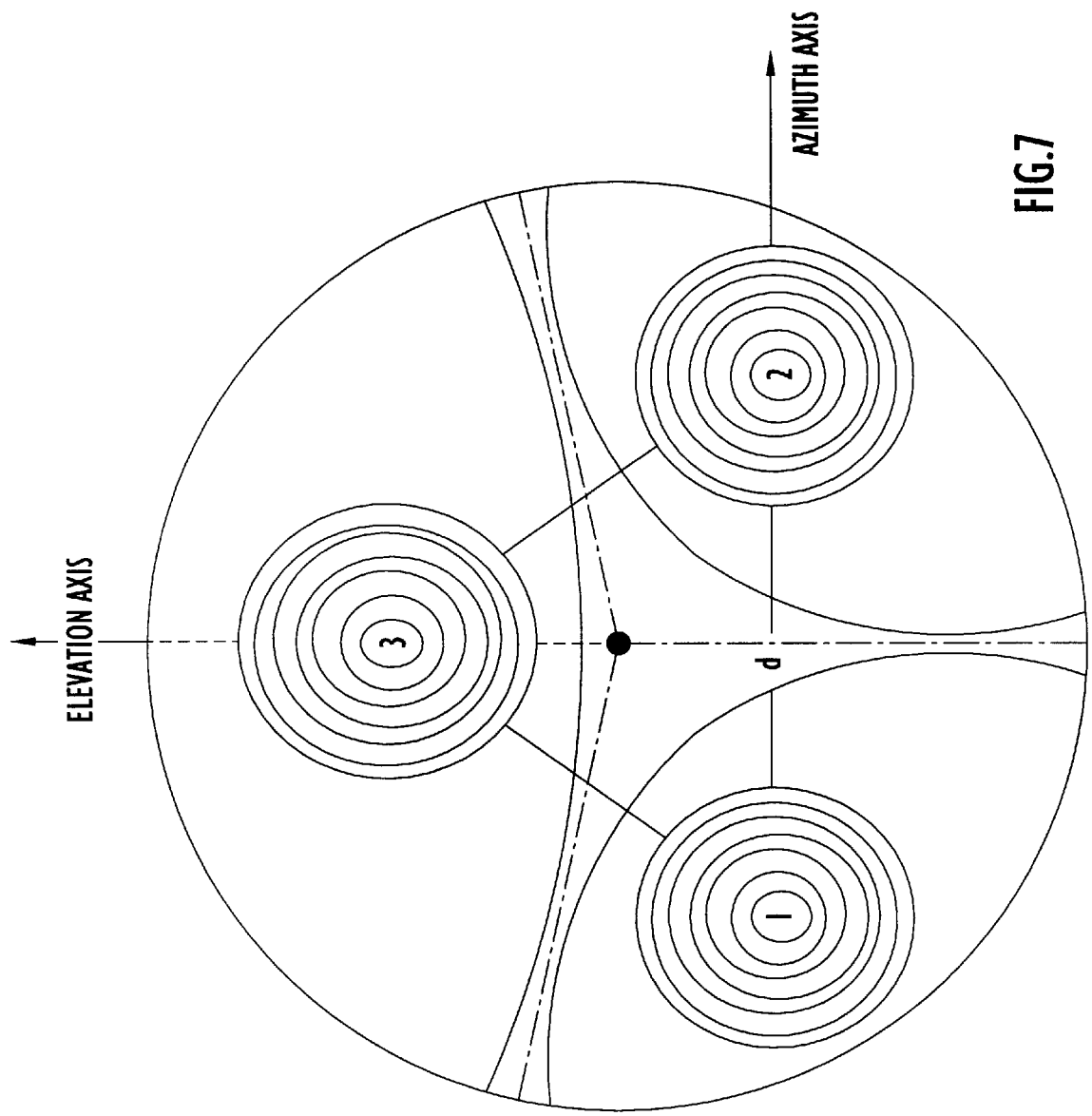
FIG. 7 illustrates an azimuth and elevation angle measurement system configuration including three squinted antenna components.
Figure 8:
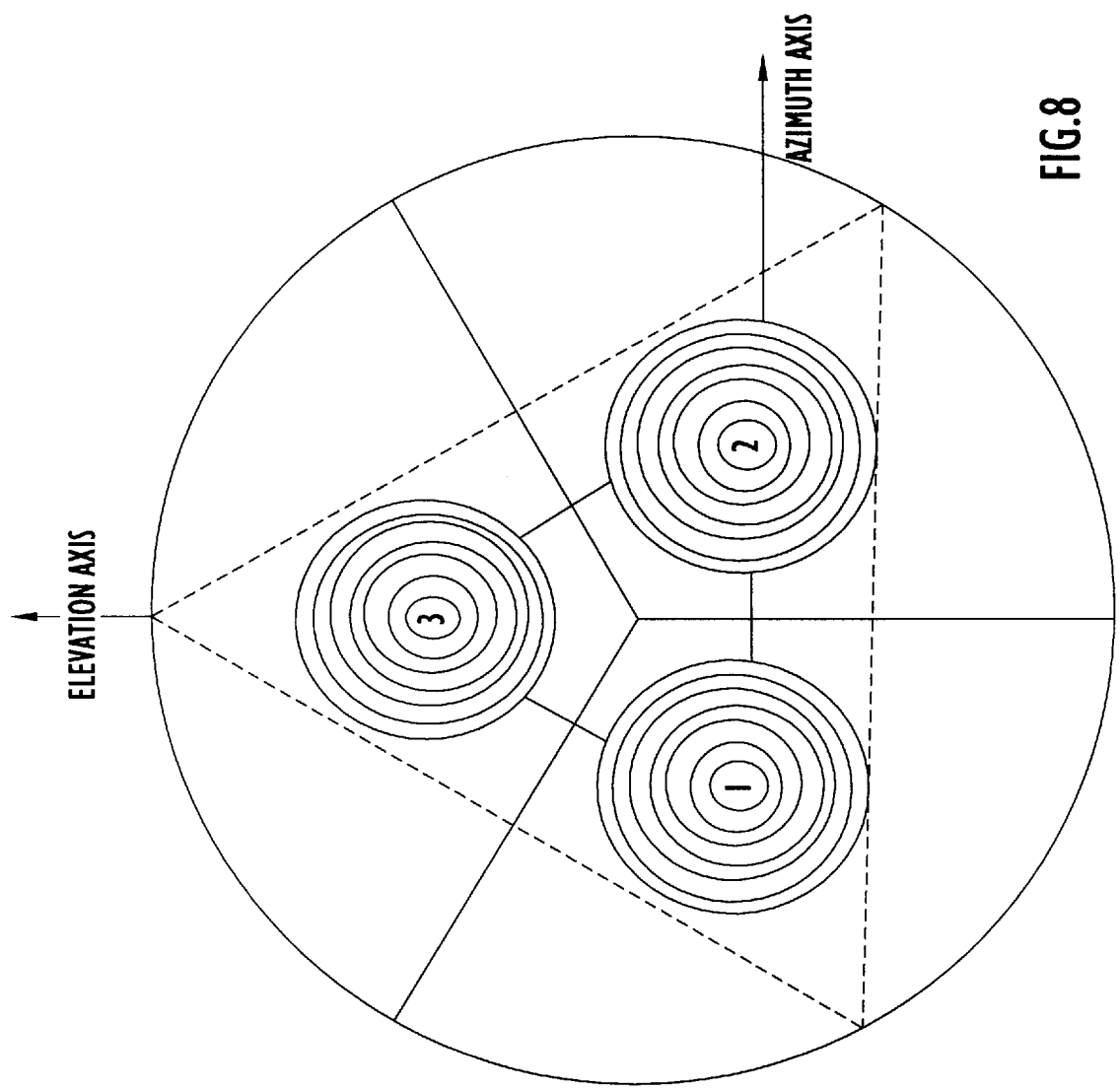
FIG. 8 illustrates an alternative azimuth and elevation angle measurement system configuration including three squinted antenna components.

In FIG. 5 a preliminary indication of an obtainable preferred overall system size is illustrated, i.e., an overall diameter of about 10 cm, including interferometer baselines (d/$\lambda$) which lead to angular measurements with associated standard deviation around $\sigma\theta$~1°, at intermediate frequencies f~10 GHz. ($\lambda$~3 cm). In roughly approximating the size of the present invention, one can assume d~6.5 cm, interferometer arm $\phi_s$~$\epsilon_s$~35°, squint angles
s=r ($2\phi_s$)~7.9 cm
r=[d/2 $\sin(\phi_s)$]~5.7 cm FIGS. 6 through 9 illustrate a few candidate symmetrical configurations considered. FIG. 6 illustrates a 4-element (1, 2, 3 and 4) symmetrical configuration having elements 1 and 2 squinted in azimuth and elements 3 and 4 squinted in elevation. FIG. 7 illustrates a first 3-element configuration (1, 2 and 3) with each element being separated from each other element by a distance d. The embodiment of FIG. 7 has elements 1 and 2 squinted in azimuth and element 3 squinted in elevation. FIG. 8 illustrates a second 3-element (1, 2 and 3) configuration again having elements 1 and 2 squinted in azimuth and element 3 squinted in elevation.

Figure 9:
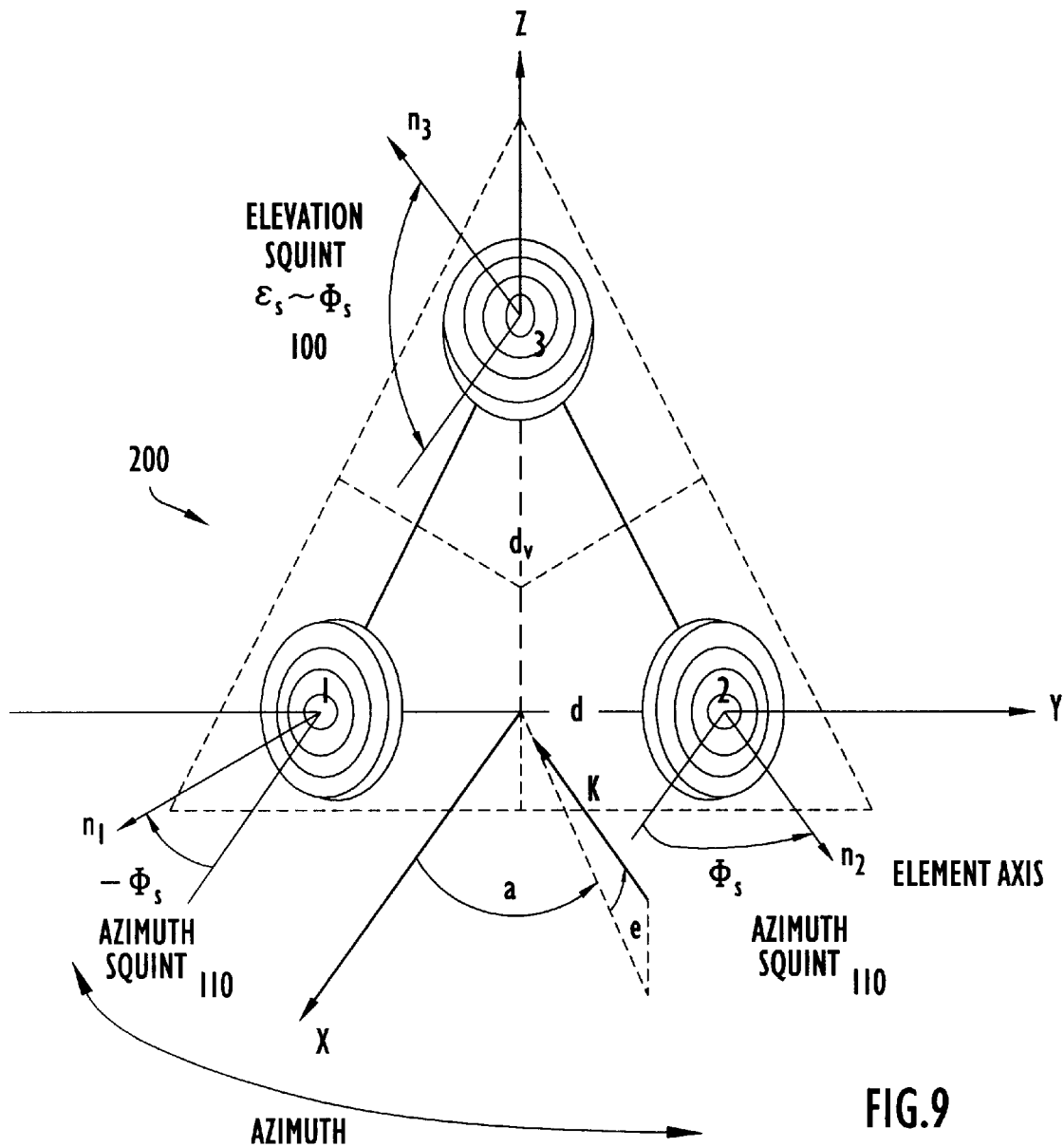
FIG. 9 illustrates the geometric relationships for an azimuth and elevation angle measurement system configuration including three squinted antenna elements.

FIG. 9 shows the essential physical features and geometrical relationships of a 3-element squinted antenna configuration 200. This configuration will be used as a basis for our discussion. Note that while elements 1 and 2 are squinted in azimuth, the element 3 is squinted in elevation. It should be understood that elements 1, 2, 3 and 4 of the embodiments 6–9 preferably take the form of broad-band, dual-polarization antenna elements.

Note that the same analysis that will now be discussed can be applied in a straightforward manner to the discussion of the 4-element scheme shown in FIG. 6. Both the interferometric and amplitude-comparison components of the overall system are modeled by discussing their interaction with a generic radiation wave vector K by means of vectorial analysis. The resultant expressions are generalizations of formulas that are frequently found in the discussion of angle-of-arrival measurement techniques.

Finally, the hardware apparatus of the present proposed invention "Azimuth & Elevation Direction Finding System Based on Hybrid Amplitude/Phase Techniques", will use some basic elements and procedures already implemented in the previous, successful development of the above-mentioned azimuth-only system by the same authors (i.e., "Hybrid Amplitude/Phase Comparison Direction Finding System", U.S. Pat. No. 5,541,608, July 1996), the entire disclosure of which is hereby incorporated by reference. The interested reader is referred to this patent for further details.

Referring now more particularly to FIG. 9, as set forth therein is illustrated a three cavity-backed broadband spiral antenna system 200. Therein the plane Z-Y is determined by the electrical centers of the antenna elements 1, 2 and 3. Location vectors can be set forth for the centers as:

$$R_1 = \{0, -d/2, 0\} \tag{1}$$

$$R_2 = \{0, +d/2, 0\} \tag{2}$$

$$R_3 = \{0, 0, +dv\} \tag{3}$$

For discussion purposes, empirical values for d, dv can be taken to be 6 to 7 cm approximately.

The corresponding vectors representing interferometer arm pairs are:

$$d_{12} = (R_2 - R_1) = \{0, d, 0\} \tag{4}$$

$$d_{13} = (R_3 - R_1) = \{0, d/2, dv\} \tag{5}$$

$$d_{23} = (R_3 - R_1) = \{0, -d/2, dv\} \tag{6}$$

Figure 10:
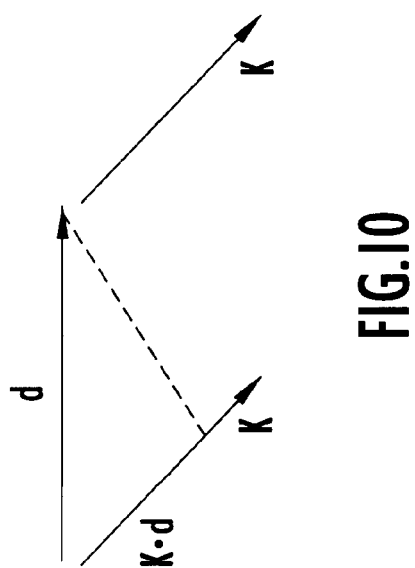
FIG. 10 illustrates directional components of the wave vector K.

Referring now to FIGS. 9 and 10, a generic radiation wave vector with reference to the antenna system axes can be set forth as including components:

$$K = K\{\cos(e)\cos(a), \cos(e)\sin(a), \sin(e)\}, \tag{7}$$

$$K = (2\,\Pi/\lambda) = (2\,\Pi f/c) \tag{8}$$

where a="azimuthal" tilt angle with reference to the antenna system axes and e="elevation" tilt angle with reference to the antenna system axes.

The interferometric subsystem measures a phase difference $\Phi_{ij}$ between antenna pair, i.e., projection of each interferometer arm $d_{ij}$ onto the radiation wave-vector K. That is, $$\Phi_{12} = K \cdot d_{12}, \ \Phi_{13} = K \cdot d_{13}, \ \Phi_{23} = K \cdot d_{23} \text{ (scalar products)} \tag{9}$$

There are several possible choices for "effective" vertical arm in the interferometer, since $$(dv)^2 = (d_{13})^2 - (d/2)^2, \text{ by simply selecting} \tag{10}$$

$$d_{13} = d_{23} = (\sqrt{5/2})d \sim 1.12d, \tag{11}$$

$$\text{one can get } dv \sim d(\sim 6\,\text{cm.}) \tag{12}$$

Phase-differences $\Phi_{12}$, $\Phi_{13}$ and $\Phi_{23}$ explicitly depend on the angles "a" and "e" as follows:

Phase diff. between "Horizontal" elements 1 and 2:

$$\Phi_{12} = K \cdot d_{12} = K\,d\,\cos(e)\sin(a), \text{ with } K = (2\,\Pi/\lambda) \tag{13}$$

Phase diff. between "Horizontal-Vertical" elements 1-3 and 2-3:

$$\Phi_{13} = K \cdot d_{13} = +(½)\,\Phi_{12} + Kdv\,\sin(e) \text{ (vector } d_{13} = ½d_{12} + dv) \tag{14}$$

$$\Phi_{23} = K \cdot d_{23} = -(½)\,\Phi_{12} + Kdv\,\sin(e) \text{ (vector } d_{23} = ½d_{12} + dv) \tag{15}$$

The above relations provide ways to obtain "fine estimates" of "a" and "e" by means of phase difference measurements, i.e., the familiar interferometric expressions:

$$\sin(a) = [\Phi_{12}/K\,d\,\cos(e)], \text{ and,} \tag{16}$$

$$\sin(e) = [½(\Phi_{13} + \Phi_{23})/K\,dv] \tag{17}$$

However, phases $\Phi_{ij}$ are measured in a mod ($\Phi_{ij}$, 2 Π) sense, and one needs an independent way to discriminate between the interferometric ambiguities separated by angles $\Delta\theta_{amb} \sim (\lambda/d)$, approximately. Ambiguity resolution via the unambiguous amplitude comparison subsystem is utilized according to the present invention.

Amplitude-comparison Subsystem

Figure 11:
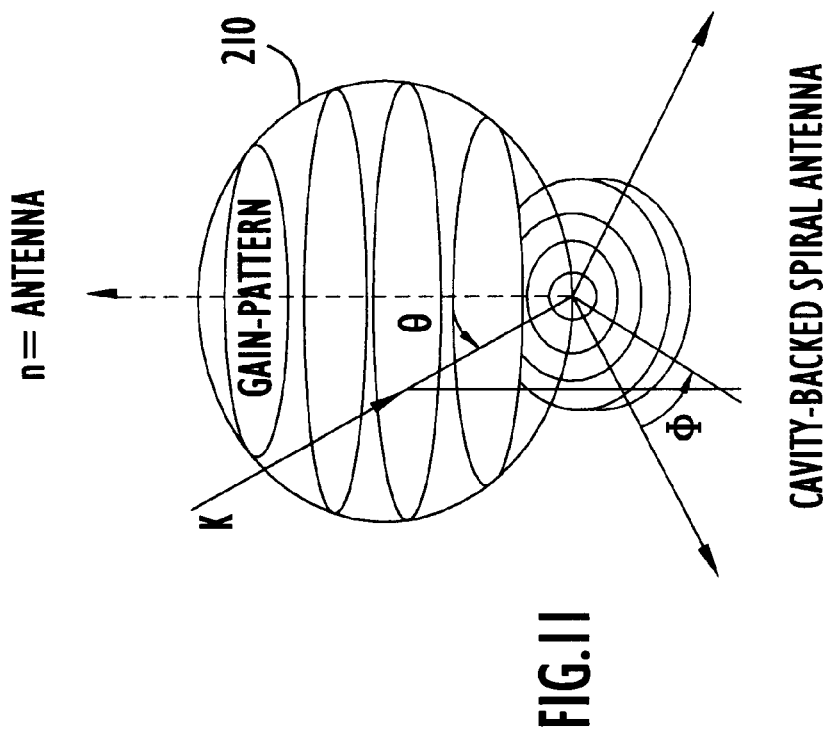
FIG. 11 illustrates a three-dimensional representation of a gain pattern for a cavity backed antenna.

Referring now also to FIG. 11, squinted antenna elements lead to measurable amplitude differences which depend on the angle-of-arrival of the radiation. Amplitude comparison can be used to provide coarse-measure angles "a" and "e" with sufficient accuracy to resolve interferometric ambiguities (rule of thumb: amplitude comparison accuracy $\sim (1/10)$ beamwidth).

To some approximation, one can see that the gain pattern 210 of each cavity-backed spiral antenna essentially depends only on the angle-off-axis θ, and not on φ (symmetry of revolution). Hence, to simplify the discussion, we will make use of a simple cardioid model approximation for the db-gain, and use empirical parameter values, i.e., $$G(\theta) = = -C[1 - \cos(\theta)] \ \text{db} \tag{18}$$

$$= -3\{[1 - \cos(\theta)] / [1 - \cos(½\theta_{bw})]\} \ \text{db}$$

where $\theta_{bw}$=beamwidth (freq. dependent), $\theta_{bw} \sim 75°$ at 10 GHz, $C = 3/[1 - \cos(½\,\theta_{bw})] \sim 15$ db, hence $$G(0) \sim 0 \ \text{db}, \tag{20}$$

$$G(\theta = ½\theta_{bw}) = -3 \ \text{db}, \tag{21}$$

$$G(\theta = 90°) = -C, \tag{22}$$

$$G(\theta = 180°) \sim -30 \ \text{db} \tag{23}$$

The amplitude-comparison subsystem measures db-gain differences between antenna pairs, that is:

$$\Delta_{ij} = G(\theta_j) - G(\theta_i) = C[\cos(\theta_j) - \cos(\theta_i)] \quad (24)$$
$$= C[(K \cdot n_j)/K - (K \cdot n_i)/K],$$

where the dot indicates scalar product operation between vectors.

The axis of each spiral is represented by a unit vector $n_i$ with squint angle $\phi_s$, $\epsilon_s \sim 35°$. The unit vector axes associated with the spiral elements can be represented as:

$$n_1 = \{\cos(\phi_s), -\sin(\phi_s), 0\}, \quad (25)$$
$$n_2 = \{\cos(\phi_s), \sin(\phi_s), 0\}, \quad (26)$$
$$n_3 = \{\cos(\epsilon_s), 0, \sin(\epsilon_s)\} \quad (27)$$

Amplitude-comparison—Azimuth
Since:

$$\Delta_{12} = C[(K \cdot n_2)/K - (K \cdot n_1)/K], \quad (28)$$

the measured amplitude difference $\Delta_{12}$ between elements 1 and 2 explicitly depends on the direction-of-arrival, i.e. angles "a" and "e". Computing the scalar products we get:

$$\Delta_{12} = \{2C\sin(\phi_s)\} \times \cos(e)\sin(a) \quad (29)$$
$$= \{6\sin(\phi_s)/[1 - \cos(\tfrac{1}{2}\theta_{bw})]\} \times \cos(e)\sin(a) \text{ db},$$

This illustrates that sin(a) can be obtained from a measurement of the db-gain difference $\Delta_{12}$ and from an independent measurement of the elevation "e". That is, (amplitude comparison):

$$\sin(a) = \{\Delta_{12}/[2C\sin(\phi_s)]\cos(e)\} \quad (30)$$

Typical measurement errors $\sigma\Delta_{12} \sim 1$ to 1.5 db, lead to angle errors $$\sigma a\text{'s} \sim 0.14 \text{ rad} \sim 8° \sim (\tfrac{1}{10})\theta_{bw} \quad (31)$$

It is instructive to compare the expression (30) with the "equivalent" expression (16) for the phase-difference, i.e., $$\sin(a) = [\phi_{12}/K \, d \cos(e)] \text{ e.g., } d \sim 6 \text{ cm.}, \lambda \sim 3 \text{ cm}, \{2 \Pi d/\lambda\} \sim 12 \quad (32)$$

In this case, typical phase measurement errors $\sigma\Phi_{12} \leq 10° \sim 0.175$ rad, lead to angle errors $\sigma a\text{'s} \sim 1°$.

Amplitude-comparison—Elevation
Consider a measurement of the amplitude difference $\Delta_{13}$:

$$\Delta_{13} = C[(K \cdot n_3)/K - (K \cdot n_1)/K] \quad (33)$$

Computation of the scalar products, shows that:

$$\Delta_{13} = C \sin(\epsilon_s) \sin(e) - (\tfrac{1}{2})\Delta_{12} + C\{\cos(e) \cos(a) [\cos(\epsilon_s) - \cos(\phi_s)]\} \quad (34)$$

and similarly, $$\Delta_{23} = C \sin(\epsilon_s) \sin(e) + (\tfrac{1}{2})\Delta_{12} + C\{\cos(e) \cos(a) [\cos(\epsilon_s) - \cos(\phi_s)]\} \quad (35)$$

It should be noted that the above expressions (34) and (35), are simplified (drop terms of the $2^{nd}$ line), if one uses the same azimuth and elevation squint angle i.e., $\phi_s = \epsilon_s$.

Then, one gets $$\tfrac{1}{2}(\Delta_{13} + \Delta_{23}) = C \sin(\epsilon_s) \sin(e). \quad (36)$$

A coarse estimate of the elevational angle "e" is obtained from (36), i.e., $$\sin(e) = \{\tfrac{1}{2}(\Delta_{13} + \Delta_{23})/C \sin(\epsilon_s)]\} \text{ where } \phi_s = \epsilon_s \quad (37)$$

The "slope"

$$C \sin(\epsilon_s) = \{3 \sin(\epsilon_s)/[1 - \cos(\tfrac{1}{2}\theta_{bw})]\} \sim 15 \text{ db/rad}. \quad (38)$$

Again it should be noted that the "elevation" slope $C \sin(\epsilon_s)$ is only one half the "azimuth" slope $2C \sin(\phi_s)$ of equation (30); however, the statistical variance of the quantity $\tfrac{1}{2}(\Delta_{13} + \Delta_{23})$ is also one half the variance associated with $\Delta_{12}$ in the expression $$\sin(a) = \{\Delta_{12}/[2C \sin(\phi_s)] \cos(e)\}. \quad (39)$$

Hence the obtainable amplitude comparison rms angle accuracies, $\sigma a$ and $\sigma e$, should be comparable, (i.e. 0.14 rad.$\sim 8°$), which is adequate for resolution of the interferometric ambiguities separated by an angle $\Delta\theta_{amb} \sim (\lambda/d) \sim 0.5$ rad at 10 GHz).

It is instructive to compare the amplitude comparison "elevation" formula (37) with the corresponding phase-comparison expression (17).

Candidate Measurement Procedure—Analytical Description

Gain-differences (i.e., $\Delta_{13}$, $\Delta_{23}$, $\Delta_{12}$) and phase-differences (i.e. mod($\phi_{13}$, 2 Π), mod ($\phi_{23}$, 2 Π), mod ($\phi_{12}$, 2 Π)) between pairs of antenna elements are measured according to the present invention.

A coarse elevation angle estimate is obtained via amplitude-comparison expression (37), i.e. $\sin(e1) = 0.5 (\Delta_{13} + \Delta_{23})/C \sin(\epsilon_s)$. The sign of sin(e), $-(\Pi/2) < e < \Pi/2$, is given by the sign of $(\Delta_{13} + \Delta_{23})$; while $\cos(e) = +\text{sqrt}(1-\sin(e)^2)$. An estimate of the associated error indicates that $\delta \sin(e1) \sim \{\delta(\Delta_{13} + \Delta_{23})/2C \sin(\epsilon_s)\} \sim 0.14$ rad$\sim 8°$, for typical values $\delta\Delta_{ij} \sim 1.5$ db.

A coarse azimuth angle estimate is obtained via amplitude-comparison expression (30), i.e. $\sin(a1) = \Delta_{12}/2C \sin(\phi_s) \cos(e1)$ with similar error estimate, $\delta(\sin(a1)) \sim \{\delta\Delta_{12}/2C \sin(\phi_s) \cos(e1)\}$.

A fine estimate of sin(e) is next obtained via the interferometric expression (17), i.e. $\sin(e2) = 0.5(\phi_{13} + \phi_{23})/K \, dv = 0.5[\text{mod}(\phi_{13}, 2 \Pi) + \text{mod}(\phi_{23}, 2 \Pi) + 2 \Pi Ne]/K \, dv$. The number of cycles "Ne", i.e., the ambiguity resolution, can be obtained by computing the nearest integer associated with the expression below. This expression uses the amplitude comparison coarse estimate $\sin(e1)(\sim \sin(e2))$ in conjunction with the phase measurements, to compute the nearest integer.

$$Ne \sim (\tfrac{1}{2} \Pi) \{K \, dv \sin(e1) - 0.5[\text{mod}(\phi_{13}, 2 \Pi) + \text{mod}(\phi_{23}, 2 \Pi)]\}.$$

Since phase-differences, i.e., mod($\phi_{ij}$, 2 Π), are measured within 10° error, the resultant e2 obtained from (17) is about one order of magnitude more accurate than e1, obtained from (37).

Next, the interferometric expression (16) is used to compute an accurate estimate of sin(a), i.e., $\sin(a2) = \phi_{12}/Kd \cos(e) = [\text{mod}(\phi_{12}) + Na \, 2 \, \Pi]/[Kd \cos(e2)]$.

Again, the number of cycles 2 ΠNa (ambiguity resolution) is obtained by computing the nearest integer associated with the expression below, which uses the amplitude comparison coarse estimate $\sin(a1) \sim \sin(a2)$ in conjunction with phase measurement mod($\phi_{12}$, 2 Π). That is, the nearest integer, $Na \sim (\tfrac{1}{2} \Pi) [Kd \cos(e2) \sin(a1) - \text{mod}(\phi_{12}, 2 \Pi)]$

We claim:

1. A method for finding a direction of arrival associated with a radiated electromagnetic wave, said method comprising the steps of:

detecting said radiated electromagnetic wave;

measuring at least one gain difference and at least one phase difference associated with said detected electromagnetic wave;

estimating an elevational angle and an azimuthal angle associated with said detected electromagnetic wave using said at least one measured gain difference;

determining a plurality of possible elevational and azimuthal angles associated with said detected electromagnetic wave using said at least one measured phase difference; and, respectively selecting one of said plurality of possible elevational and one of said plurality of possible azimuthal angles as elevational and azimuthal angles associated with said detected electromagnetic wave using said estimated elevational and azimuthal angles.

2. The method of claim 1, wherein said step of measuring at least one gain difference associated with said detected wave further comprises the step of measuring gain differences between pairs of antenna elements.

3. The method of claim 2, wherein said step of measuring at least one phase difference associated with said detected radiation further comprises the step of measuring phase differences between said pairs of antenna elements.

4. The method of claim 1, wherein said step of measuring at least one gain difference associated with said detected radiation further comprises the steps of:

measuring a first gain difference between a first antenna element and a second antenna element;

measuring a second gain difference between said first antenna element and a third antenna element; and, measuring a third gain difference between said second antenna element and said third antenna element.

5. The method of claim 4, wherein said step of measuring at least one phase difference associated with said detected radiation further comprises the steps of:

measuring a first phase difference between said first antenna element and a second antenna element;

measuring a second phase difference between said first antenna element and said third antenna element; and, measuring a third phase difference between said second antenna element and said third antenna element.

6. The method of claim 4, wherein said step of estimating said elevation angle comprises using said second and third gain differences.

7. The method of claim 6, wherein said step of estimating said azimuthal angle comprises using said first phase difference.

8. The method of claim 5, wherein said step of determining a plurality of possible elevation angles comprises using said second and third phase differences.

9. The method of claim 8, wherein said step of determining a plurality of azimuthal angles comprises using said first phase difference.

10. A device for finding a direction of arrival associated with a radiated electromagnetic wave, said device comprising:

at least first and second antenna elements adapted to detect said electromagnetic wave and being squinted in azimuth with respect to a first axis;

at least a third antenna element adapted to detect said electromagnetic wave and being squinted in elevation with respect to said first and second antenna elements;

means for determining a plurality of gain differences for waves detected by said first, second and third antenna elements;

means for determining a plurality of phase differences for waves detected by said first, second and third antenna elements;

means for estimating an elevation angle and an azimuthal angle associated with said electromagnetic wave using at least one of said plurality of gain differences;

means for determining a plurality of possible elevational angles and a plurality of possible azimuthal angles associated with said electromagnetic wave using at least one of said determined phase differences; and, means for selecting one of said possible elevational angles and one of said possible azimuthal angles using said estimated elevational and azimuthal angles, respectively.

11. The device of claim 10, wherein said means for determining a plurality of gain differences comprises means for measuring a first gain difference between said first antenna element and said second antenna element, measuring a second gain difference between said first antenna element and said third antenna element, and, measuring a third gain difference between said second antenna element and said third antenna element.

12. The method of claim 11, wherein said means for determining a plurality of phase differences comprises means for measuring a first phase difference between said first antenna element and a second antenna element, measuring a second phase difference between said first antenna element and said third antenna element, and, measuring a third phase difference between said second antenna element and said third antenna element.

13. The device of claim 10, further comprising a fourth antenna element being squinted in elevation with respect to said first and second antenna elements.

14. A method for correcting for a coning error associated with azimuthal-only direction finding systems for aircraft comprising the steps of:

detecting a radiated electromagnetic wave;

measuring at least one gain difference and at least one phase difference associated with said detected wave;

estimating an elevational angle associated with said detected electromagnetic wave using said at least one measured gain difference;

determining a plurality of possible elevational angles associated with said detected electromagnetic wave using said at least one measured phase difference; and, selecting one of said plurality of possible elevational angles using said estimated elevational angle.

15. The method of claim 14, wherein said step of selecting one of said plurality of possible elevational angles using said estimated elevational angles comprises the step of comparing said estimated elevational angle to at least one of said plurality of possible elevational angles.

16. The method of claim 15, wherein said step of measuring at least one gain difference associated with said detected radiation further comprises the steps of:

measuring a first gain difference between a first antenna element and a second antenna element; and, measuring a second gain difference between said first antenna element and a third antenna element.

17. The method of claim 16, wherein said step of measuring at least one phase difference associated with said detected radiation further comprises the steps of:

measuring a first phase difference between said first antenna element and a second antenna element; and, measuring a second phase difference between said first antenna element and said third antenna element.

18. The method of claim 17, wherein said step of estimating said elevation angle comprises using said first and second gain differences.

19. The method of claim 18, wherein said step of determining a plurality of possible elevation angles comprises using said first and second phase differences.

20. The method of claim 19, wherein said first antenna element is a broadband spiral antenna element squinted in elevation with respect to a system axis, and said second an third antenna elements are broadband spiral antenna elements squinted in azimuth with respect to said system axis.

* * * * *